United States Patent
Gasslbauer

(10) Patent No.: US 10,036,438 B2
(45) Date of Patent: Jul. 31, 2018

(54) PAD RETAINING SPRING FOR A BRAKE PAD AND BRAKE PAD RETAINER FOR A DISC BRAKE ON A MOTOR VEHICLE

(71) Applicant: Knorr-Bremse Systeme fuer Nutzfahrzeuge GmbH, Munich (DE)

(72) Inventor: Franz Gasslbauer, Johanniskirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 19 days.

(21) Appl. No.: 15/042,552

(22) Filed: Feb. 12, 2016

(65) Prior Publication Data
US 2016/0160945 A1    Jun. 9, 2016

Related U.S. Application Data

(63) Continuation of application No. PCT/EP2014/002248, filed on Aug. 14, 2014.

(30) Foreign Application Priority Data

Aug. 16, 2013   (DE) ........................ 10 2013 013 686

(51) Int. Cl.
   *F16D 65/40*      (2006.01)
   *F16D 65/097*     (2006.01)
   *F16D 55/225*     (2006.01)

(52) U.S. Cl.
   CPC ....... *F16D 65/0978* (2013.01); *F16D 55/225* (2013.01); *F16D 65/0976* (2013.01)

(58) Field of Classification Search
   CPC . F16D 65/0978; F16D 55/225; F16D 65/0976
   USPC ... 188/73.38, 73.37, 73.36, 234, 250 R, 258, 188/250 E, 250 B
   See application file for complete search history.

(56) References Cited

U.S. PATENT DOCUMENTS

| 4,049,087 A * | 9/1977 | Heinz ................... F16D 55/227 188/73.38 |
| 4,527,669 A | 7/1985 | Meyer et al. |
| 2004/0262099 A1 | 12/2004 | Crippa |

(Continued)

FOREIGN PATENT DOCUMENTS

| CN | 101932846 A | 12/2010 |
| DE | 1 580 745 | 12/1970 |
| DE | 38 39 957 A1 | 5/1990 |

(Continued)

OTHER PUBLICATIONS

Chinese Office Action issued in counterpart Chinese Application No. 201480045413.X dated Mar. 29, 2017 with English translation (11 pages).

(Continued)

*Primary Examiner* — Pamela Rodriguez
(74) *Attorney, Agent, or Firm* — Crowell & Moring LLP

(57) ABSTRACT

A pad retaining spring for a brake pad on a disc brake includes a spring section which can be mounted captively and so that it can be radially deflected at an edge of the pad carrier plate. The lining retaining spring has a partial section designed as a clamping section which extends at an angle from one end of the spring section of the pad retaining spring. A brake pad retainer for a disc brake on a motor vehicle is also provided.

14 Claims, 2 Drawing Sheets

(56) References Cited

U.S. PATENT DOCUMENTS

| | | |
|---|---|---|
| 2009/0211857 A1 | 8/2009 | Camilo-Martinez et al. |
| 2012/0006633 A1 | 1/2012 | Pahle |

FOREIGN PATENT DOCUMENTS

| | | |
|---|---|---|
| DE | 40 20 287 A1 | 1/1992 |
| DE | 101 59 504 A1 | 6/2003 |
| DE | 601 09 216 T2 | 4/2006 |
| DE | 10 2005 037 483 A1 | 3/2007 |
| DE | 10 2007 016 392 A1 | 8/2008 |
| DE | 10 2007 016 393 A1 | 8/2008 |
| DE | 10 2007 049 980 A1 | 4/2009 |
| DE | 10 2009 008 341 A1 | 8/2010 |
| DE | 10 2010 023 143 A1 | 12/2011 |
| EP | 0 534 987 B1 | 8/1994 |
| EP | 2 050 978 A2 | 4/2009 |
| GB | 1102457 | 2/1968 |
| JP | 2008-208970 A | 9/2008 |
| JP | 2009-287640 A | 12/2009 |
| SU | 1351519 A3 | 11/1987 |

OTHER PUBLICATIONS

International Search Report (PCT/ISA/210) issued in PCT Application No. PCT/EP2014/002248 dated Nov. 20, 2014, with English translation (four (4) pages).

German Office Action issued in counterpart German Application No. 10 2013 013 686.5 dated May 8, 2014 (eight (8) pages).

International Preliminary Report on Patentability (PCT/IB/326, PCT/IB/338, and PCT/IB/373) issued in PCT Application No. PCT/EP2014/002248 dated Feb. 25, 2016, including Written Opinion (PCT/ISA/237) with English translation (thirteen (13) pages).

Russian-language Office Action issued in counterpart Russian Application No. 2016109267/11 dated Sep. 1, 2017 with English translation (Fourteen (14) pages).

* cited by examiner

PAD RETAINING SPRING FOR A BRAKE PAD AND BRAKE PAD RETAINER FOR A DISC BRAKE ON A MOTOR VEHICLE

CROSS REFERENCE TO RELATED APPLICATIONS

This application is a continuation of PCT International Application No. PCT/EP2014/002248, filed Aug. 14, 2014, which claims priority under 35 U.S.C. § 119 from German Patent Application No. 10 2013 013 686.5, filed Aug. 16, 2015, the entire disclosures of which are herein expressly incorporated by reference.

BACKGROUND AND SUMMARY OF THE INVENTION

The present invention relates to a pad holding spring of a brake pad for a disc brake having a spring piece, which can be mounted in a manner that is secure against loss and allows radial deflection on an edge of the pad carrier plate, as well as to a brake pad holding arrangement for a disc brake of a motor vehicle.

Pad holding springs of this kind are normally used in prior-art brake pad holding arrangements of brake pad systems. In these brake pad systems, brake pads are respectively arranged on both sides of a brake disc, each brake pad having a friction pad and a pad carrier plate carrying the friction pad. The brake pads are held under a radial spring load in a manner secured by a pad holding spring of each brake pad in a pad slot of a fixed brake carrier having brake carrier horns on the leading-edge side and the trailing-edge side laterally enclosing the brake pads.

A pad holding spring of the type in question is known from DE 40 20 287 A1, for example. In this case, the pad holding spring, which is designed as a leaf spring, is secured on the brake pad carrier on holding lugs projecting from an outer edge of the brake pad carrier, by which the pad holding spring is held both in and counter to the direction of rotation of the brake disc and also radially with respect to the axis of rotation of the brake disc.

The inner sides of the brake carrier horns laterally delimiting the pad slot are usually aligned parallel to one another, allowing a brake pad formed with two lateral edges aligned parallel to one another to be introduced radially into the pad slot from above and secured with the aid of the pad holding spring. The brake pads are spanned by a pad holding bracket which thus contributes to stabilization of the brake pads by counteracting accelerations or shaking loads caused by external forces acting from outside transversely to the direction of application.

These transverse forces acting on the pad during the braking process must be introduced into the brake carrier via the brake carrier horns. However, it is generally not possible to embody the supporting surfaces of these brake carrier horns in an optimum manner, owing to limited installation space conditions, the result being that the movements of the brake pad during a braking process also include a rotary motion. Such rotary motions can have a negative effect on the release clearance, namely the free travel between the brake pad and the brake disc, and on the wear behaviour of the brake pads, e.g. in the form of oblique wear.

It is always necessary to guide and fix the brake pads reliably in the brake carrier in order to ensure reliable functioning of the disc brake.

In the case of newer brake pad concepts with asymmetrically formed brake pads, the brake pad is guided at one lateral end face by means of positive engagement with an inner side of a carrier horn of the brake carrier. During assembly, the brake pad can thus be inserted into the pad slot between the carrier horns by way of a pivoting movement, ensuring that, after pivoting of the brake pad into the working position between the carrier horns, the opposite lateral end face of the brake pad lies in front of the inner side of the opposite carrier horn, said side facing the brake pad, and has radial freedom of movement.

If this brake pad then lifts off radially upwards owing to external forces acting on the free side from the outside, transversely to the direction of application, the distance between the brake pad and said carrier horn increases and the brake pad is neither retarded nor hindered in any other way in its movement radially away from the brake disc.

In this case, even the preloading force of the pad holding spring supported on the pad holding bracket cannot absorb these externally acting forces, and therefore the brake pad has such a large freedom of movement that, when it falls back into its initial position after such a pivoting movement, it strikes the supporting surface at the bottom of the pad slot, and this can lead to fracture or cracking of the friction pad of the brake pad.

It is the object of the present invention to provide a pad holding spring and a brake pad holding arrangement for a disc brake which ensure fixing of the brake pads in the brake carrier in such a way that a radial pivoting movement of the brake pad out of the pad slot can be largely prevented.

This object is achieved by a pad holding spring of a brake pad having a spring section, which can be mounted in a manner that is secure against loss and allows radial deflection on an edge of the pad carrier plate. The pad holding spring has a subsection which is designed as a wedging section and which extends at an angle from one end of the spring section of the pad holding spring and by a brake pad holding arrangement for a brake pad having such a pad holding spring for a disc brake of a motor vehicle.

In addition to a pad holding spring part designed as a spring section, which can be mounted in a manner that is secure against loss and allows radial deflection on an edge of the pad carrier plate, the pad holding spring according to the invention has a subsection which is designed as a wedging section and which extends at an angle from one end of the spring section of the pad holding spring.

In the brake pad holding arrangement according to the invention, the pad holding spring is designed in a corresponding manner in such a way that, in the mounted position, a subsection of the pad holding spring extends over that edge of the pad carrier plate which faces the brake carrier horn on the trailing-edge side and into a gap between the brake carrier horn on the trailing-edge side and that lateral edge of the pad carrier plate which faces the brake carrier horn on the trailing-edge side.

On the one hand, this allows simple mounting of the pad holding spring on the brake pad and of the brake pad with the pad holding spring mounted thereon in the pad slot of the brake carrier between the brake carrier horns. On the other hand, after the mounting of the pad holding spring and the insertion of the brake pad into the pad slot, this prevents the brake pad from being twisted out during a braking process by virtue of the wedging action of the subsection of the pad holding spring on that lateral edge of the pad carrier plate of the brake pad which faces the brake carrier horn on the trailing-edge side.

According to an advantageous variant embodiment of the invention, the subsection of the pad holding spring is of rectilinear design, allowing very simple mounting of the pad holding spring in the gap between the pad carrier plate and the brake carrier horn.

It is also contemplated, depending on the width of the gap between the pad carrier plate and the pad carrier horn on the trailing-edge side, for the subsection of the pad holding spring to be embodied as at least partially undulating or serrated transversely to the longitudinal extent of the subsection and to the direction of rotation of the brake pad, thereby also making it possible in a simple manner reliably to prevent the brake pad from being twisted out of a gap with a relatively large gap width.

According to an advantageous development of the invention, a transitional subsection is provided between the spring section and the subsection of the pad holding spring. This transitional subsection is of arc-shaped design and, in particular, runs in an arc around a corner region of the pad carrier plate. This makes the mounting of the pad holding spring in its functional position even easier. In addition, this ensures that, by virtue of wedging of the subsection of the pad holding spring between the brake carrier horn on the trailing-edge side and the side wall of the pad carrier plate, slight twisting out of the brake pad does not lead to release of the joint between the pad holding spring and that edge of the pad carrier plate which faces away from the axis of rotation of the brake disc since, in this case, the transitional subsection can be deformed out of the arc-shaped configuration with a predetermined radius into a shape with an enlarged radius and thus provides the necessary length compensation.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the figures, terms such as top, bottom, left, right, front, rear etc. refer exclusively to the illustrative representation and position of the brake carrier, brake pad, brake holding spring, brake carrier horn and the like chosen in the respective figures. These terms are not to be taken as restrictive, that is to say these relations may change due to different working positions or mirror-symmetrical design or the like.

Figure 1:
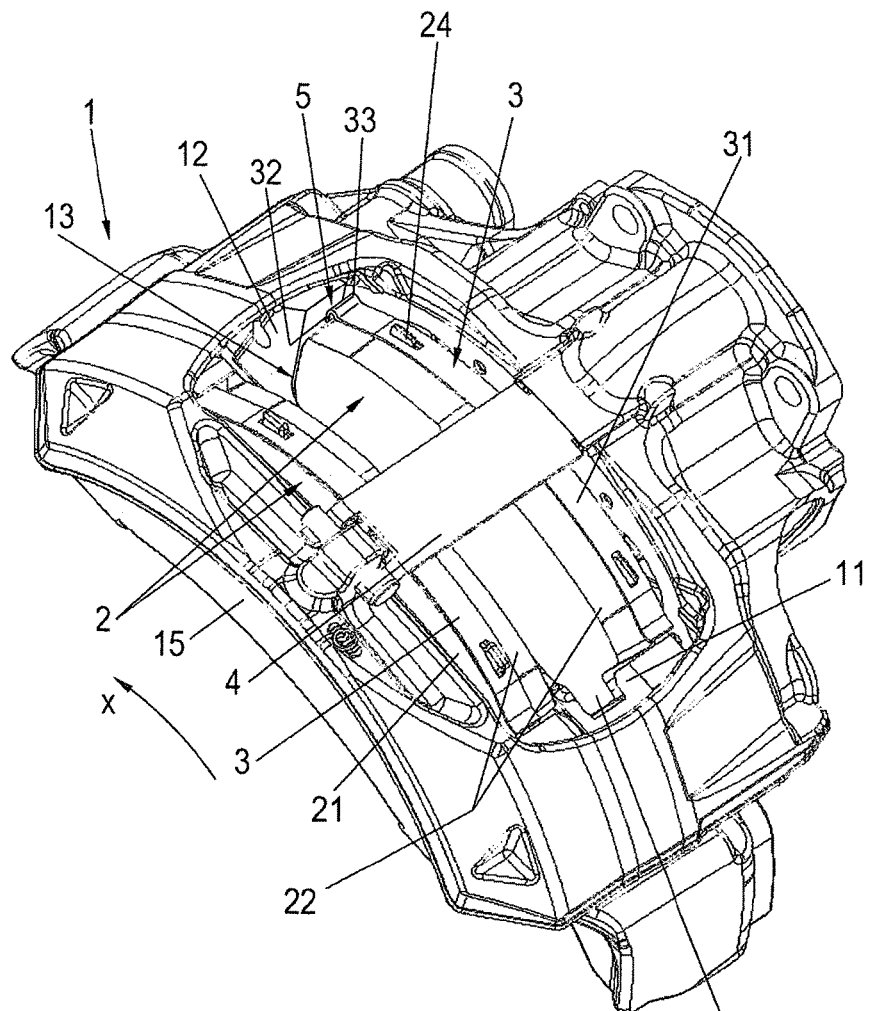
FIG. 1 is a schematic view of a section of an embodiment of a brake pad holding arrangement having a pad holding spring arranged on each of the brake pads.

FIG. 1 shows a basic arrangement of one embodiment of a brake pad holding arrangement according to the invention for a disc brake, in particular for a commercial vehicle disc brake.

In this case, the brake pad 2 with a pad carrier plate 21 and a friction pad 22 is inserted into a pad slot 13 of a brake carrier 1. Here, the brake carrier 1 spans a brake disc (not shown), which rotates in a main direction X of rotation, together with a wheel axle of the motor vehicle during the forward motion of the motor vehicle on which it is mounted.

The brake pads 2 are preferably arranged on both sides of the brake disc and can be pressed against the brake disc during a braking process.

The brake carrier 1 has brake carrier horns 11, 12 on the leading-edge and trailing-edge side, which form the pad slot 13 and laterally enclose the brake pads 2, and a bridge 15, which connects the brake carrier horns 11, 12 to one another. Here, the distance between the brake carrier horns 11, 12 is dimensioned in such a way in the main direction X of rotation of the brake disc that, during fitting, a brake pad 2, in particular the pad carrier plate 21 of the brake pad 2, is initially inserted into the pad slot by way of a first lateral end face and is then moved fully into the pad slot by way of a pivoting movement. The result is that the opposite lateral end face 26 of the pad carrier plate 21 of the brake pad 2 lies opposite the brake carrier horn 12 on the trailing-edge (see FIG. 2).

Figure 2:
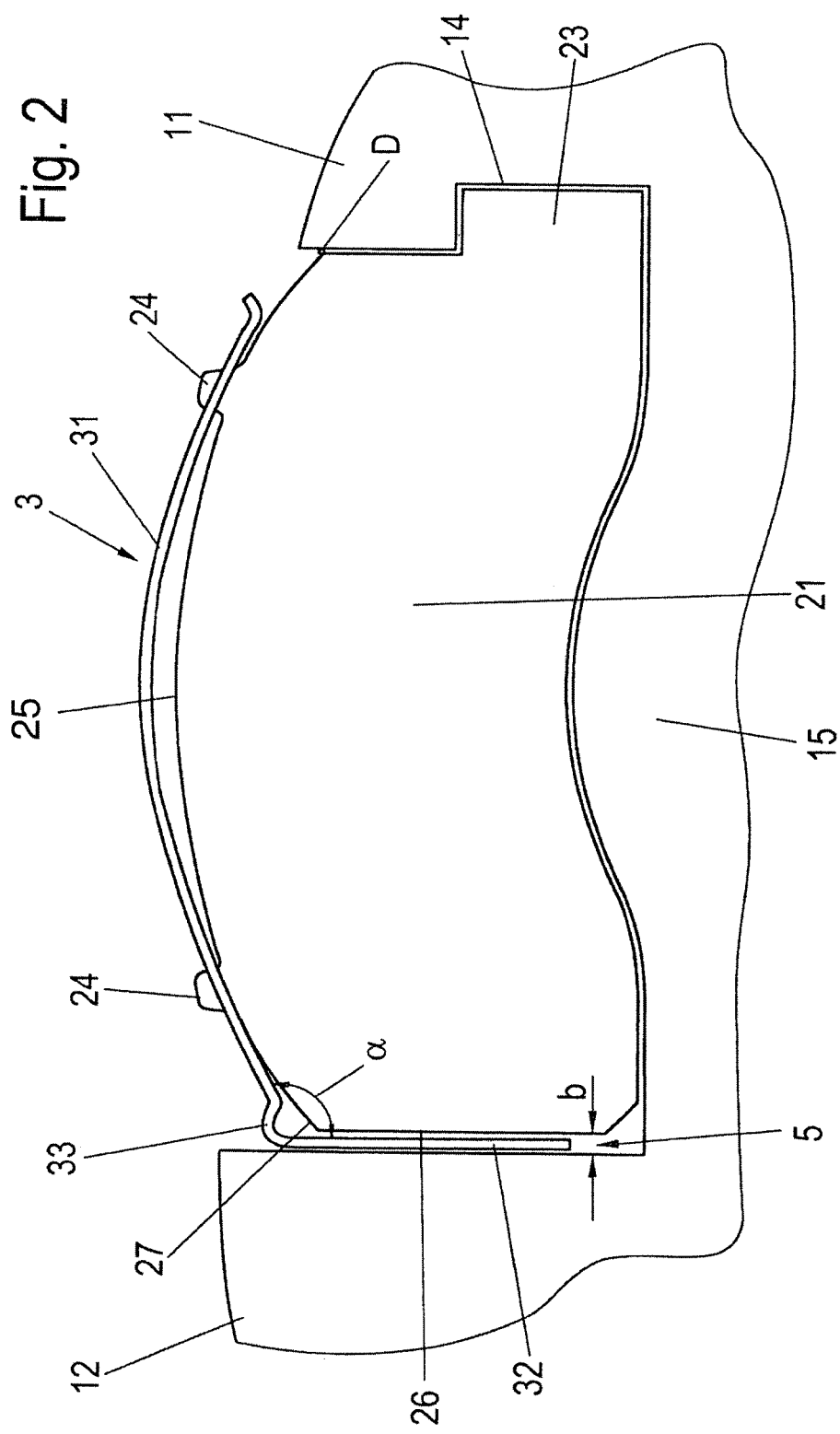
FIG. 2 is a schematic view from the front of a brake pad inserted in a brake carrier and having a pad holding spring arranged thereon.

As is readily apparent in FIGS. 1 and 2, that side of the brake pad 2 which faces the brake carrier horn 11 on the leading-edge side has a projection 23, which, in the mounted state of the brake pad 2, is accommodated with positive engagement in a recess 14 on the inner side of the brake carrier horn 11, said side facing the brake pad 2.

In order to prevent the brake pad 2 from being twisted out of the pad slot 13 in operation, not only during forward travel, during which the brake pad is prevented from being twisted out by the positive engagement between the projection 23 and the recess 14 in the brake carrier horn 11, but also during reverse travel, a pad holding spring 3 is mounted on the brake pad 2, in particular on the pad carrier plate 21. The spring has a spring part 31, which is held in a manner that is secure against loss and allows radial deflection on an edge 25 of the pad carrier plate 21 which faces away from the bridge 15 of the brake carrier 1, and a subsection 32, which extends at an angle thereto on one end of the spring part 31 and, in the mounted position, as shown in FIG. 2, extends over that edge of the pad carrier plate 21 which faces the brake carrier horn 12 on the trailing-edge side and into a gap 5 present, after the insertion of the brake pad 2 into the pad slot 13, between the brake carrier horn 12 on the trailing-edge side and that lateral edge 26 of the pad carrier plate 21 which faces the brake carrier horn 12 on the trailing-edge side.

In this case, the spring part 31 of the pad holding spring 3 is secured in the direction of rotation of the brake disc and radially with respect to the axis of rotation of the brake disc on the upper edge 25 of the pad carrier plate 21, which faces away from the bridge 15, preferably by use of respective lugs 24, which project radially outwards from the edge 25 of the pad carrier plate 21. The pad holding spring 3 is spanned centrally above the spring part 31 by a pad holding bracket 4, which extends axially with respect to the axis of rotation of the brake disc over the pad slot 13 and on which the pad holding spring 3 is supported.

Subsection 32 of the pad holding spring 3, said subsection being designed or serving as a wedging section, has the effect that the brake pad 2 cannot be removed or twisted out of the pad slot 13 without first removing said subsection 32 of the pad holding spring 3 since the gap 5 that allows it to be twisted out is restricted by the insertion of subsection 32 of the pad holding spring 3 to such an extent that the brake pad 2 is prevented from being twisted out.

In a preferred variant embodiment, as shown in FIG. 2, this subsection 32 of the pad holding spring 3 is of rectilinear design. However, an at least partially undulating or serrated embodiment or shape of this subsection 32, transversely to the longitudinal extent of subsection 32 and to the axis D of rotation of the pivoting movement of the brake pad 2, is also conceivable, depending on the width b of the gap 5 and/or on the thickness of the material of the pad holding spring 3.

As illustrated in FIGS. 1 and 2, the pad holding spring 3 is preferably designed as a leaf spring. In addition to the design of the pad holding spring 3 as a leaf spring, it is also contemplated to design the pad holding spring 3 as a wire spring, wherein subsection 32 of the pad holding spring 3 can in this case also be shaped in a spiral, for example, in order to be able to fill what may be a larger width b of the gap 5 so as to wedge the brake pad 2.

In a particularly preferred embodiment, the subsection 32 of the pad holding spring 3 which is designed as a wedging section and spring part 31 are connected to one another by a transitional subsection 33. Here, this transitional subsection 33 is preferably of arc-shaped design, with the result that spring piece 31 and the subsection 32 angled relative to spring piece 31 preferably enclose an angle α of 70 to 120°, depending on the geometry of the brake pad 2. Here, the transitional subsection 33 runs around in an arc into the corner region 27 of the pad carrier plate 21 of the brake pad 2.

LIST OF REFERENCE SIGNS 1 brake carrier
11, 12 brake carrier horns
13 pad slot
124 recess
15 bridge
2 brake pad
21 pad carrier plate
22 friction pad
23 projection
24 lugs
25 edge
26 lateral end face
27 corner region
3 pad holding spring
31 spring part
32 subsection
33 transitional subsection
4 pad holding strap
5 gap
b width
D axis of rotation
X main direction of rotation The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad holding arrangement for a disc brake of a motor vehicle, wherein brake pads are associated on both sides with a brake disc, the arrangement comprising:
a fixed brake carrier having a pad slot with brake carrier horns which laterally enclose the brake pads,
wherein each of the brake pads has a friction pad and a pad carrier plate carrying the friction pad and has a pad holding spring, which is secured against loss and held in a manner which allows radial deflection on an edge of the pad carrier plate facing away from a bridge of the brake carrier,
wherein the pad carrier plate of the brake pads includes a projection on a leading-edge side facing a brake carrier horn, where the projection, in an installed state, positively engages the brake carrier horn in a recess formed on an inner side of the brake carrier horn facing the brake pads, during installation, each of the brake pads being initially inserted into a pad slot of the brake carrier by way of a first lateral end face and being subsequently moved fully into the pad slot by way of a pivoting movement, and
wherein, in a mounted position, a subsection of the respective pad holding spring extends over a lateral edge of the corresponding pad carrier plate which faces the brake carrier horn on a trailing-edge side and into a gap between the brake carrier horn on the trailing-edge side and the lateral edge of the corresponding pad carrier plate which faces the brake carrier horn on the trailing-edge side, such that the brake pads are prevented from being twisted out during a braking operation by way of a wedging action of the subsection of the respective pad holding spring.

2. The brake pad holding arrangement according to claim 1, wherein the subsection of the respective pad holding spring is matched to a contour of the lateral edge of the corresponding pad carrier plate which faces the brake carrier horn on the trailing-edge side.

3. The brake pad holding arrangement according to claim 2, wherein the subsection of the respective pad holding spring is of rectilinear design or is of at least partially undulating or serrated design transversely to a longitudinal extent thereof and to an axis of rotation of the brake pads.

4. The brake pad holding arrangement according to claim 3, wherein a transitional subsection of the respective pad holding spring between a spring piece arranged along the edge of the corresponding pad carrier plate which faces away from the bridge of the brake carrier and the subsection which extends into the gap between the brake carrier horn on the trailing-edge side and the lateral edge of the corresponding pad carrier plate which faces the brake carrier horn on the trailing-edge side is designed such that the transitional subsection runs in an arc around a corner region of the corresponding pad carrier plate.

5. The brake pad holding arrangement according to claim 4, wherein the respective pad holding spring is designed as a leaf spring or as a wire spring.

6. The brake pad holding arrangement according to claim 3, further comprising:
a spring section mountable in a manner which secures against loss and allows radial deflection on an edge of the pad carrier plate of the respective brake pad, wherein a transitional subsection of the corresponding pad holding spring between the spring section and the subsection is of arc-shaped design.

7. The brake pad holding arrangement according to claim 6, wherein the transitional subsection is formed in an arc such that the spring section and the subsection angled relative to the spring section enclose an angle (α) of 70° to 120°.

8. The brake pad holding arrangement according to claim 1, wherein the subsection of the respective pad holding spring is of rectilinear design or is of at least partially undulating or serrated design transversely to a longitudinal extent thereof and to an axis of rotation of the brake pads.

9. The brake pad holding arrangement according to claim 1, wherein a transitional subsection of the respective pad holding spring between a spring piece arranged along the edge of the corresponding pad carrier plate which faces away from the bridge of the brake carrier and the subsection which extends into the gap between the brake carrier horn on the trailing-edge side and the lateral edge of the corresponding pad carrier plate which faces the brake carrier horn on the trailing-edge side is designed such that the transitional subsection runs in an arc around a corner region of the corresponding pad carrier plate.

10. The brake pad holding arrangement according to claim 1, wherein the respective pad holding spring is designed as a leaf spring or as a wire spring.

11. The brake pad holding arrangement according to claim 1, wherein the arrangement is configured for a commercial vehicle disc brake.

12. The brake pad holding arrangement according to claim 1, further comprising:
   a spring section mountable in a manner which secures against loss and allows radial deflection on an edge of the pad carrier plate of the respective brake pad, wherein a transitional subsection of the corresponding pad holding spring between the spring section and the subsection is of arc-shaped design.

13. The brake pad holding arrangement according to claim 12, wherein the transitional subsection is formed in an arc such that the spring section and the subsection angled relative to the spring section enclose an angle ($\alpha$) of 70° to 120°.

14. The brake pad holding arrangement according to claim 1, wherein the projection of the respective pad carrier plate laterally projects toward a leading-edge side of the corresponding brake carrier horn.

* * * * *